Feb. 26, 1924.  
W. FELL  
GASOLINE FILTER  
Filed March 5, 1920

1,484,767

Inventor  
William Fell  
Attys.

Patented Feb. 26, 1924.

1,484,767

UNITED STATES PATENT OFFICE.

WILLIAM FELL, OF CHICAGO, ILLINOIS, ASSIGNOR TO VISIBLE GASOLINE FILTER COMPANY, OF CHICAGO, ILLINOIS, A CORPORATION OF ILLINOIS.

GASOLINE FILTER.

Application filed March 5, 1920. Serial No. 363,544.

*To all whom it may concern:*

Be it known that I, WILLIAM FELL, a citizen of the United States, and a resident of Chicago, in the county of Cook and State of Illinois, have invented certain new and useful Improvements in Gasoline Filters, of which the following is a specification.

My invention relates to improvements in gasoline filters, and more particularly to a device of the character described designed to be placed in the gasoline feed line of a motor vehicle for the purpose of removing impurities from the liquid in its passage from the supply tank to the carburetor of the motor.

The object of the present invention is to provide certain improved features of construction pertaining more particularly to the filtering medium, the manner in which the filtering medium is mounted within the filter, and to the means employed for giving the filtering medium a definite formation, calculated to afford a more efficient and lasting filtering device. As a preferable filtering medium, I employ a chamois having the qualities of permeability and elasticity which are well known, together with other qualities which make this material desirable for this purpose. However, other substances having like qualities may well be substituted for chamois.

Figure 1:
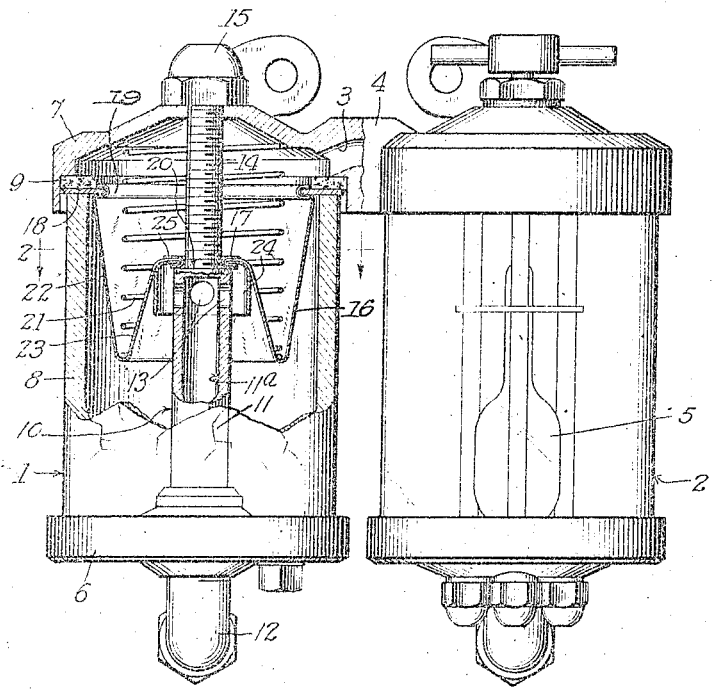
Figure 2:
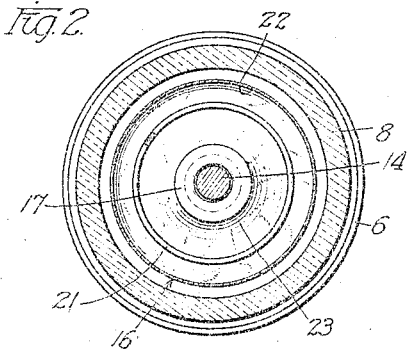

The features of my invention hereinbefore referred to, as well as others, are hereinafter more fully pointed out, and in connection with the accompanying drawings, in which Fig. 1 is a front view in elevation of the filter with portions shown in vertical section, disclosing the features embodied in the invention, and Fig. 2 is a cross-sectional view of the filtering receptacle taken on line 2—2, of Figure 1.

A preferred construction for a filter embodying the features of my invention comprises two similar vertically disposed receptacles 1 and 2, joined together to form a single filtering unit, and communicating with each other at their upper ends by means of a passage 3 formed in a short neck portion 4, the latter acting to join the receptacles together. The receptacle 1 is the filtering receptacle into which the unfiltered gasoline passes, the receptacle 2 serving as a reservoir for the filtered gasoline from which it is returned to the gasoline feed line, and thence conducted to the carburetor. The feature of the receptacle 2 is the presence of a hydrometer 5 mounted therein for the purpose of testing the filtered gasoline.

Inasmuch as the present invention relates more specially to features associated with the filtering receptacle 1, this part of the device will be described in detail, it being understood that the two receptacles are quite similar in construction. The receptacle 1 preferably consists of a lower cap 6 and upper cap 7 and an intermediate cylindric wall portion 8 preferably in the form of a cylindric glass tube or jar. The upper and lower edges of the glass jar 8 bear against gaskets of suitable material 9 which are introduced between the contacting surfaces of the jar and the caps 6 and 7. Integral with the lower cap 6 is a centrally disposed post 10 extending axially of the wall section 8, and through an aperture formed in the upper cap 7 and terminating above the same. The post 10 throughout substantially one-half its height is hollow or tubular, and forms an inlet passage 11 which communicates with an inlet connection 12 below the cap 6, and at its upper end communicates with the interior of the receptacle through a plurality of holes 13 located at the upper end of said inlet passage. Upwardly beyond the tubular portion of the post 10 the latter assumes the form of a threaded stem 14 of reduced diameter, said stem portion projecting upwardly through the cap 7 as before suggested, and surmounted by a nut 15 which, when tightened, draws the parts together and forms a liquid tight receptacle.

Referring now more in detail to the filtering medium 16 preferably of chamois as hereinbefore suggested, the same is fashioned of this material, and prior to its introduction into the filter has the shape of the frustrum of a cone, its base of maximum diameter being substantially equal to that of the receptacle whereas its apex or base of minimum diameter is provided with a hole which is reinforced by a metal eye 17, said eye having a diameter to receive the stem 14 of the post 10. The margins of the chamois filtering medium or screen surrounding the base of maximum diameter are preferably secured to a circular gasket 18 by means of a metal binding ring 19 acting to securely join the edges of the chamois to the internal annular margin of the gasket. The filtering medium or screen having thus been made is assembled within the receptacle by inserting the gasket 18 between the upper edge of the glass jar 8 and the gasket 9, the eye 17 at the apex of the screen being inserted over the stem 14 of the post 10, said eye resting upon a shoulder 20 formed at the junction of the tubular portion 11 and the threaded stem portion 14. This shoulder 20 is preferably located some distance below the upper edge of the glass jar 8; therefore the apex of the filtering screen will be positioned a like distance below the gasket 18 representing the base of the filtering medium. In the absence of any other parts associated with the filtering screen or cone as it may be called by reason of its shape, the material would merely sag or bag downwardly. However, in order to give the filtering cone a definite shape as well as for other purposes, a comparatively light coil spring 21 is mounted above the filtering cone and bears at its lower end against the material of the filtering cone and at its upper end against the cap 7. As before suggested the spring 21 is of a light construction having a helical formation and having a diameter somewhat less than the diameter of the filtering cone at its base and somewhat greater than its diameter at its apex. In other words it has a diameter equal to the mean diameter of the filtering cone. The spring is located concentrically within the receptacle and constantly bears downwardly against the material of the filtering cone with sufficient pressure to retain the same in a definite form; namely, two inclined wall portions 22 and 23 which converge toward the lower extremity of the filtering medium at which point the lower end of the spring bears. The function of the spring is at least two-fold.

First, it exerts sufficient pressure upon the material of the filtering medium to insure its tautness to a predetermined degree at all times thereby increasing the permeability of the material and the capacity of the same to permit a given quantity of liquid to pass through.

Second, by reason of the initial formation of the filtering medium in cone shape and the presence of the spring, the filtering medium is given the shape hereinbefore described, and provides in reality a double wall construction and for this reason the area of the filtering surface is greatly increased not only by reason of the double wall, but by reason also of the conical shape of the wall portions 22 and 23. By increasing the area of the filtering surface it is manifest that a larger quantity of the liquid can pass through the filtering medium, and hence a larger quantity of the liquid filtered during a given period, or under conditions requiring the delivery of a large quantity of gasoline to the motor in a comparatively short period. An instance of this is the use of a filter in connection with a vacuum feed system, or under other conditions which require a sudden and large demand upon the gasoline supply on the starting of the motor.

As a further feature of my invention, I provide in connection with the filtering cone a cylindric baffle plate 24 arranged to surround the upper part of the tubular portion 11 of the post 10. This member preferably has the form of a metal sleeve somewhat greater in diameter than the tubular portion 11 of the post 10, and preferably having an inwardly turned flange 25 at its upper end adapted to be inserted and retained within the eye 17 of the filtering medium although obviously this may be completely detached from the screen and seated on the shoulder 20 at the upper end of the tubular portion 11 of the post 10. The cylindric wall of the baffle 24 is arranged concentrically with the post 10 and spaced outwardly at a suitable distance therefrom to permit the free passage of the liquid outwardly through the openings 13. The lower margin of the baffle extends a short distance below the openings 13, and forms a downwardly facing circular passage communicating with the interior of the receptacle. The purpose of this baffle 24 is to deflect the current of the liquid in a downward direction as it is discharged from the openings 13, its primary object being to create a current of the incoming liquid downwardly into the lower portion of the receptacle prior to its passage through the filtering screen. Furthermore, the presence of the baffle overcomes the tendency of the liquid to strike directly against the adjacent wall 23 of the chamois screen which would tend to concentrate the filtering process throughout this portion of the filtering medium whereas it is desirable to permit uniform filtering throughout the entire surface of the filtering medium.

By reason of the particular construction employed and herein set forth as constituting the feature of my invention, a superior filtering action is secured; first, by reason of the particular conformation of the filtering medium whereby the maximum area of filtering surface is secured, and further by the presence of a tension or other member bearing upon the screen in such manner as to retain the same in its desired conformation, and further to exert sufficient pressure upon the material to get the desired degree of permeability.

The device embodying the features hereinabove set forth may be variously modified without departing from the spirit of the invention, and therefore I do not wish to be limited except in so far as the invention is specifically set forth in the appended claims.

I claim as my invention:

1. In a filter the combination of a receptacle, a filtering medium of relatively pliable material mounted within said receptacle with its inner and outer portion secured in fixed position, and a member mounted in said receptacle and bearing concentrically upon said filtering medium intermediate its inner and outer portions, to retain the same in a predetermined form.

2. In a filter of the character described, the combination of a cylindric receptacle, a filtering medium of relatively pliable material and of conical conformation, means for retaining the base and apex of said filtering medium in fixed relation with said receptacle, and means engaging the material of the filtering medium intermediate the base and apex thereof, and maintaining the same in a predetermined form.

3. In a filter of the character described, the combination of a receptacle, a filtering medium of permeable and relatively pliable material normally having a conical conformation, means for securing the base of said screen to the wall of the receptacle and the apex at the center thereof, and a member mounted concentrically within the receptacle, and yieldingly engaging the material intermediate its base and apex.

4. In a filter of the character described, the combination of a receptacle, a filtering medium of pliable material and normally of conical conformation, means for retaining the base and apex of said filtering medium in fixed positions spaced apart axially at a less distance than the axial dimension of the filtering medium extended, and means yieldably engaging the material of the filtering medium intermediate the base and apex thereof, and maintaining the same taut and in double wall conformation.

5. In a filter of the character described, the combination of a receptacle, a filtering medium comprising a screen of permeable and relatively elastic material having a conical conformation, means for securing the base of said screen to the wall of the receptacle and the apex at the center thereof with the intermediate portions of the material, depending loosely, and a yieldable member concentrically engaging the depending material to provide relatively taut and convergent double walls.

6. In a filter of the character described, the combination of a receptacle, a filtering medium mounted within said receptacle, and comprising a screen of pliable material, having an initial conical conformation, the base margins of said screen being fixed to the wall of said receptacle, means for fixing the apex of the screen centrally of the receptacle, and a yieldable member mounted concentrically within said receptacle and engaging said screen intermediate its base and apex.

7. In a filter of the character described, the combination of a receptacle, a tubular inlet member extending centrally of said receptacle, a filtering medium comprising a cone shaped screen of pliable material secured at its base to the wall of the receptacle at its center to said inlet member, and a tension member mounted concentrically within said receptacle and yieldingly engaging said screen intermediate the wall and inlet member of the receptacle.

8. In a filter of the character described, the combination of a receptacle, a tubular inlet member extending axially of said receptacle and provided with laterally facing discharge openings, a filtering screen mounted in said receptacle surrounding said tubular inlet member and having a wall portion spaced laterally from said discharge openings and a cylindric baffle extending axially between discharge openings and the adjacent wall portion of the filter.

9. In a filter of the character described, the combination of a receptacle, a tubular inlet member extending axially of said receptacle and provided with laterally facing discharge openings, a filtering screen mounted in said receptacle, a portion thereof being spaced laterally from the openings of said tubular inlet member, and a cylindric baffle mounted on said inlet member and extending axially between said adjacent wall portion of the filtering screen and said discharge openings.

10. In a filter, the combination of a receptacle, a tubular member in said receptacle, and having an opening communicating with the interior thereof, a screen mounted in said receptacle, a portion thereof extending over and spaced from the opening in said tubular member, and a baffle member located between said opening and the adjacent portion of said screen.

11. In a filter of the character described, the combination of a receptacle, a filtering medium of relatively elastic material mounted in said receptacle and normally of conical conformation, means for securing the base of said filtering medium to said receptacle, and a yieldable member mounted in said receptacle and bearing concentrically upon said filtering medium adjacent the apex thereof.

12. In a filter, the combination of a receptacle, a filtering medium mounted in the upper portion of said receptacle, and comprising a tubular shaped member of relatively pliable material arranged symmetrically with respect to the axis of said receptacle, and having the lower portion thereof turned back within the upper portion to form annularly spaced double wall sections, and means for retaining the material in said form.

13. In a filter, the combination of a receptacle, a filtering medium mounted within said receptacle and comprising a normally conical shaped member of relatively pliable material extending longitudinally from one end of the receptacle, a portion of said member adjacent the apex being doubled back within the portion adjacent the remaining portion in substantially W-shape in vertical section, and means for retaining the material in said form.

14. In a filter, the combination of a receptacle, a filtering medium mounted in the upper portion of said receptacle and consisting of relatively pliable material normally of conical shape, distorted into substantially W-shape in vertical section, thereby providing double wall portions converging at the lower edge of said filtering medium, and means for retaining said filtering medium in said W-conformation.

15. In a filter, the combination of a receptacle, a filtering medium mounted in the upper portion of said receptacle, and comprising a normally conical shaped member of relatively pliable material arranged symmetrically with respect to the axis of said receptacle, and having the portion thereof adjacent the apex doubled back in substantially W-conformation in vertical section, whereby an open space is formed in the lower portion of said receptacle.

16. In a filter, the combination of a receptacle, a filtering medium mounted in the upper portion of said receptacle, and comprising a normally conical shaped member of relatively pliable material depending in inverted position from the upper portion of the receptacle, the end portion of said member adjacent the apex being turned upwardly within the remaining portion, forming double wall portions converging to a lower edge spaced above the bottom of the receptacle.

In witness whereof, I hereunto subscribe my name this 1st day of March, A. D., 1920.

WILLIAM FELL.